United States Patent [19]

Story

[11] Patent Number: 4,898,451

[45] Date of Patent: Feb. 6, 1990

[54] WAX ENCASED FIBER OPTIC CABLE

[75] Inventor: Christopher A. Story, Hickory, N.C.

[73] Assignee: Siecor Corporation, Hickory, N.C.

[21] Appl. No.: 307,470

[22] Filed: Mar. 6, 1989

[51] Int. Cl.[4] ................................................. G02B 6/44
[52] U.S. Cl. .................................................... 350/96.23
[58] Field of Search ............... 350/96.23, 96.24, 96.25, 350/96.26

[56] References Cited

U.S. PATENT DOCUMENTS

| | | | |
|---|---|---|---|
| 3,902,880 | 9/1975 | Strack | 350/96.24 X |
| 3,981,706 | 9/1976 | Strack | 350/96.24 X |
| 3,983,313 | 9/1976 | Ney et al. | 174/121 SR |
| 4,172,106 | 10/1979 | Lewis | 350/96.23 |
| 4,509,821 | 4/1985 | Stenger | 350/96.23 |
| 4,514,058 | 4/1985 | Walton | 350/96.23 |
| 4,684,214 | 8/1987 | Goldmann et al. | 350/96.23 |
| 4,733,933 | 3/1988 | Pikulski | 350/96.20 |

Primary Examiner—Frank Gonzalez
Attorney, Agent, or Firm—Roy B. Moffitt

[57] ABSTRACT

An optical fiber circumscribed by a wax forming a free standing composite disposed in a buffer tube.

7 Claims, 2 Drawing Sheets

WAX ENCASED FIBER OPTIC CABLE

BACKGROUND OF THE INVENTION

There are two basic types of optical fibers, tight buffered and loose tube. A loose tube type optical fiber is a composite of an optical fiber(s) loosely disposed in a buffer tube having a diameter larger than the optical fiber(s). In some types of applications it is desirable for a single buffer tube to contain a high fiber count, for example 48 fibers. Once such a buffer tube is opened up to expose the fibers, identification and grouping of the exposed fibers becomes a problem. Known prior art suggests color coding of the plastic surrounding the individual fibers and/or colored tapes grouping individual fibers in a common bundle. While colored fibers have been widely accepted by craftsmen as a means of fiber identification, colored tapes or threads used for bundle or group identification have not been without complaints. It would be desirable to group 48 fibers into four separate groups, the fibers in each group having a fiber coating of the same color as a fiber in another group. Whatever is used to create the groups must be easily removed (preferably by non-chemical means), act as a filling compound for that part of the buffer tube cavity, retain its integrity in the presence of a filling compound in the buffer tube filling the integral spaces between groups, and be inexpensive.

The prior art abounds with various disclosures to filling and flooding compounds adapted for use in telecommunications cable for both glass and copper types. Glass, by its very nature, places limitations on what filling compounds can be used and to those that can be used, how they are applied in manufacturing. Certain waxes have been found to meet most of these limitations, especially those limitations relating to applying the wax to optical fiber bundles, coloring, and removability in preparation for splicing.

For the purposes of this disclosure, the term "wax" includes, but is not limited to wax, raw wax and oil free wax and polymers, which have a modulus of elasticity that is not greater than 200,000 psi at room temperature and an elongation at breaking of not less than ten percent (10%) at room temperature and a low tear strength, i.e., removable by a fingernail. The term "filling compound" includes organic substances in which such wax-like materials are non dispersible. This invention employs wax encased groups of optical fibers and filling compound disposed inside of a buffer tube. Not only must the wax, raw wax, plus the filling compounds be drip resistant (no drip at 65° to 80° C.), they also must be soft enough at minus 40° C. so as not to harm the fibers. The disclosed "wax" meet these requirements.

In fiber optic cable containing buffering tubes, there is the problem of antibuckling. Some sort of an antibuckling member must be provided so that the degree of dimensional change of a cable over a given temperature range is not so great, when compared to the dimensional change of the optical fiber over the same temperature range, that the optical fiber will buckle. Buckling creates severe bends, which increase attenuation. With respect to the antibuckling problem, applicants have found that by incorporating otherwise flexible elongated members, such as glass or aramid fibers, into the outermost zone of the tubular sidewall of a fiber optic buffer tube, such a structure acts to reduce buckling by causing the dimensional change of the buffer tube, from minus 40° C. to plus 80° C., to be so small that it does not cause optical fibers in it to bend or buckle to a degree that unacceptable optical losses occur or unacceptably high stresses are induced.

With respect to the waxes used in this invention, applicants have found that the disclosed wax can be readily heated to a fluid and applied to groups of optical fibers to form free standing composites prior to placing them in a buffer tube. Such wax/optical fiber composites do not fill all of the space delimited by the interior wall of the buffer tube not otherwise occupied by the wax optical fiber composites. Thus, an organic filling compound may be used to fill the interstitial space between composites. Such a filling compound should be one that will not cause the wax to go into a dispersed state, so as to preserve the integrity of the wax and optical fiber composite. Wax can be readily and easily colored, thus giving rise to an easy and convenient way to identify the group to which fibers in a given buffer tube belong. Colored wax permits coated optical fibers of the same color to be used in a given cable construction, yet providing a convenient device to distinguish fibers of the same color from one another. Once identification has been made, the wax is easily stripped exposing the fibers for splicing and other operations using no more a complicated tool than that of a fingernail.

BRIEF DESCRIPTION OF THE INVENTION

The invention is basically an optical fiber circumscribed by a wax forming a free-standing composite. More particularly, the invention is a fiber optic cable composed of a plurality of such free-standing composites circumscribed by a tube-shaped member (buffer tube) and a jacket circumscribing the tube-shaped member. An organic flooding compound may be disposed in at least a part of the space not otherwise occupied by the tube-shaped members and the free-standing composite(s). Colored filling compound is usually disposed inside of the space delimited by the circumscribing wax in the space not otherwise occupied by optical fibers.

Another embodiment of the invention employs the above described free-standing composite in an all dielectric fiber optic cable. This cable is composed of a plurality of buffer tubes in which there is disposed one or more composite(s) and a jacket of dielectric materials circumscribing the plurality of buffer tubes. Each buffer tube contains a sidewall having first and second zones. The first zone comprises a dielectric material essentially free of elongated strength members and the second zone, integral with the first zone, is comprised of elongated strength members embedded in the dielectric material.

DETAILED DESCRIPTION OF THE INVENTION

Description of Wax Encased Fiber Bundles

The term "wax" has been defined as an ester of a high molecular weight fatty acid with a high molecular weight alcohol other than glycerol. There are some waxes that fit this definition, but do not have certain physical characteristics required for this invention. Also there are other compounds that do not fit the wax definition, but are called waxes, look and behave like waxes, and have the physical characteristics required for this invention. For the purpose of this disclosure, the term "wax" shall mean compounds that fit and do not fit the above definition, but are wax-like and have the characteristics described in this disclosure.

One preferred example of a wax or wax-like compound that can be used in the instant invention is an EAA/EVA terpolymer from the A-C Polyethylenes Division of Allied-Signal, Inc., P. O. Box 2332R, Morristown, N.J. 07960, sold underneath the product name of A-C X-4252. It is to be noted that the above-identified terpolymer would not qualify as a "wax" under some definitions of the term; however, applicant understands that the industry nonetheless does refer to this particular compound as a wax. Its chemical name is 2-propenic acid, polymer with ethene and ethenyl acetate.

A filling compound that is compatible with the above-identified A-C X-4252 is a compound sold underneath the mark of Optigard X2-3351 available from Dow-Corning Corporation of Middleton, Mich. There are other filling compounds that are available that are also compatible, too numerous to mention.

Figure 1:
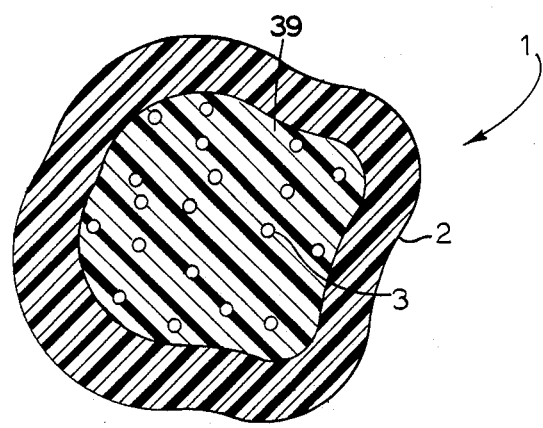
FIG. 1 is a cross sectional view of the free-standing composite of the invention.
Figure 2:
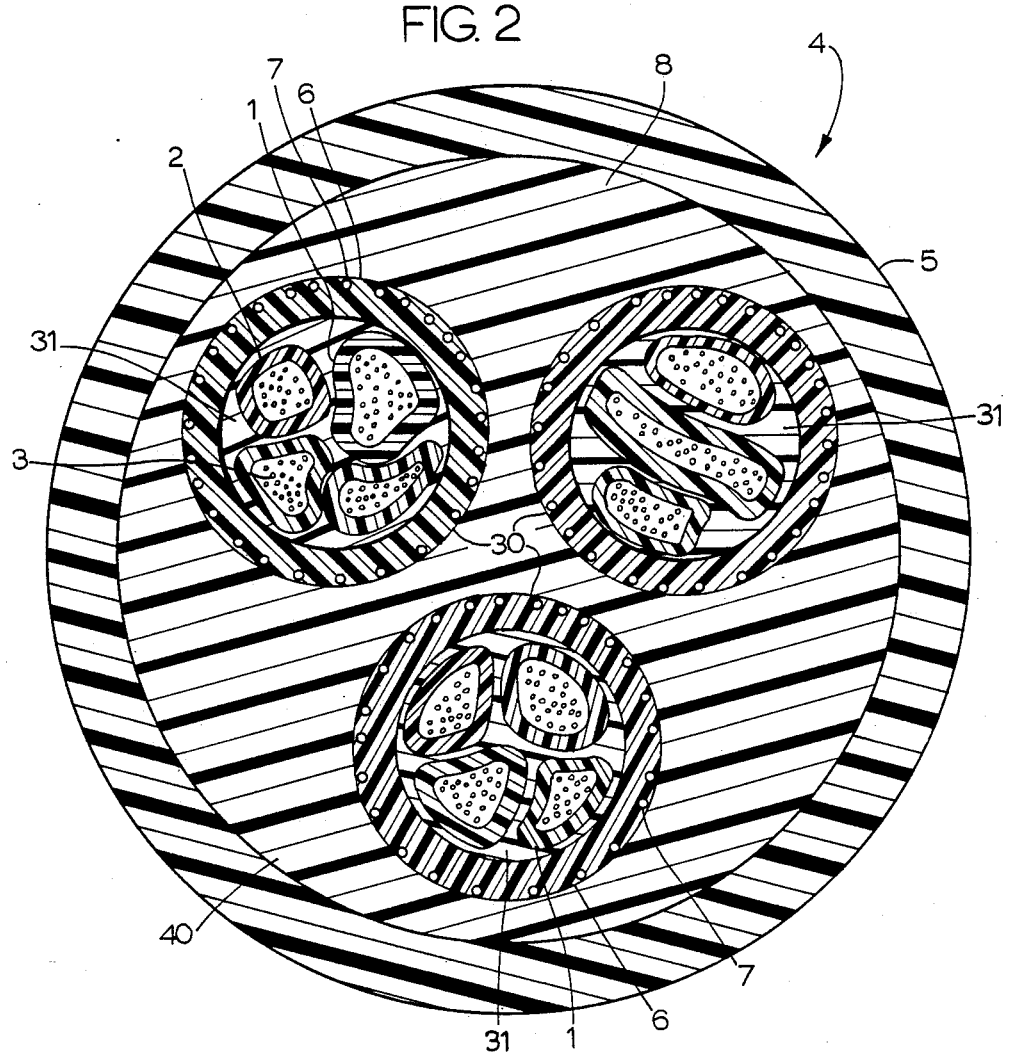
FIG. 2 is a cross-sectional drawings of a fiber optic cable employing the free-standing composite described in FIG. 1.

Shown by element 1 of FIG. 1 is a fiber optic composite of the present invention. element 2 is a tubular shaped member of wax enclosing a plurality of optical fibers 3. The space delimited by tube 2 not otherwise occupied by optical fibers 3 may be filled with a filling compound 39. Element 4 of FIG. 2 shows a cross section of the proposed cable of the invention employing a plurality of stand-alone composites 1 of FIG. 1. Shown in this drawing is a plurality of tubular members 30 composed of a jacket sidewall 6 in which there are two zones. One zone has disposed in it, a plurality of fibers such as elements 7 buried in plastic 6 and the other zone is free of such fibers. Element 7 can be either aramid, steel, glass, or other flexible fibers. Element 6 can be of any suitable plastic such as polyethylene or polyvinylchloride or any of the polyesters. Enclosed inside of tubular element 30 are a plurality of free standing wax composites 1. As shown, in spaces 8 and 31, a suitable filling compound may be disposed to take up the space that is not otherwise occupied by composite 1 in the case of tubular member 30 or the tubular members 30 in the case of jacket 5. elements 7 of tubular members 30 are optional and may be deleted. It has been found, however, that such elongated elements disposed in the manner in which they are shown, act as an antibuckling agent and decreases the possibility that optical fibers 3 will be coiled, bent, or buckled arising out of changes in temperature to the extent that undesirable attenuation is noticeable.

Description of Process to Produce Wax Encased Fiber Bundles

Figure 3:
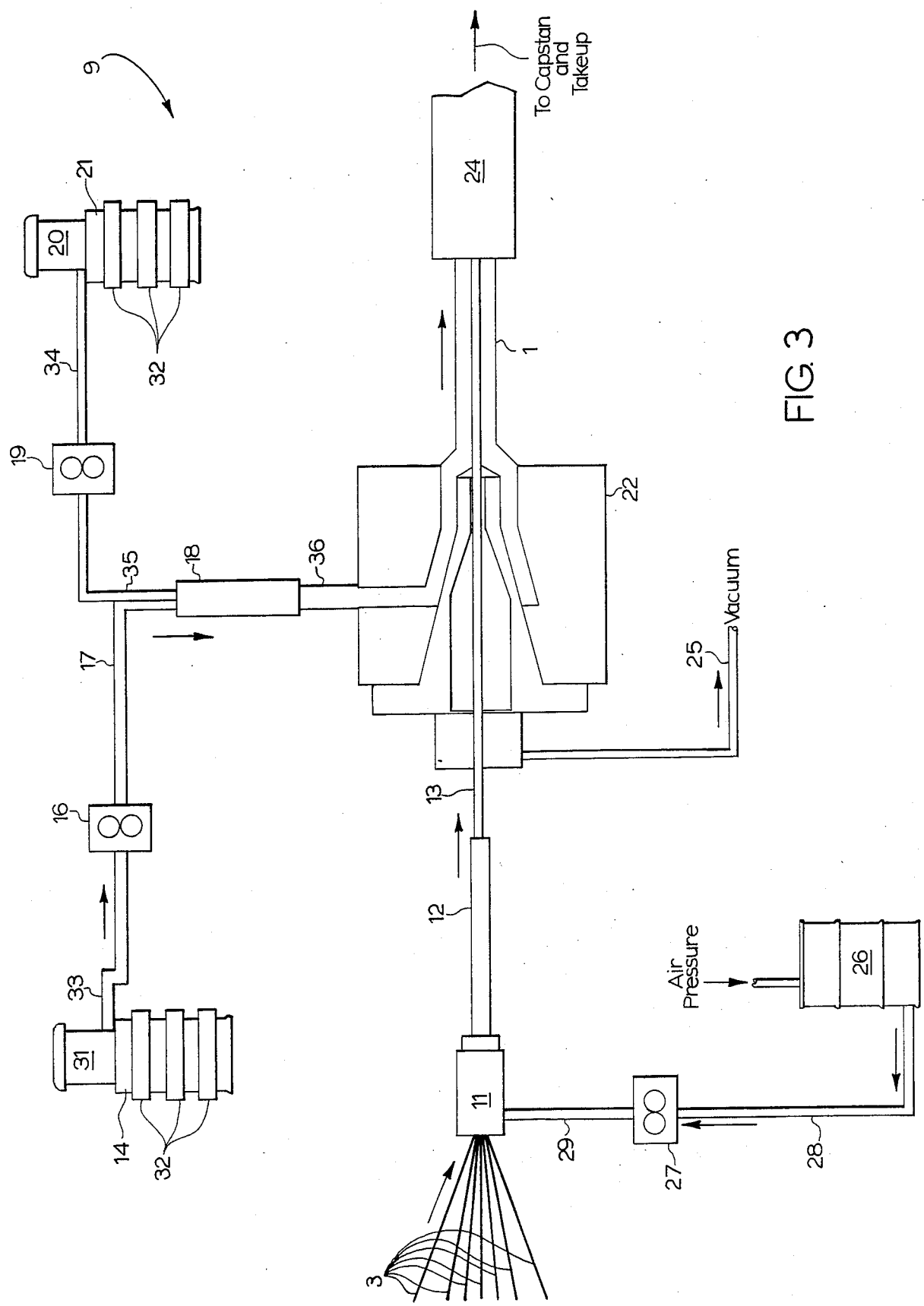
FIG. 3 is a schematic diagram of the apparatus used to carry out the invention.

Reference is now made to FIG. 3. Optical fibers 3 are payed off from a convenient apparatus such as a plurality of reels (not shown) into a filling apparatus consisting of a filling nut 11 and filling needle 12. Filling compound from drum 26 is pumped into conduit 28 through gear pump 27 and conduit 29 and then around fibers 3 using conventional filling equipment as shown. Coated fibers 13 then enter a crosshead 22 where the hot wax is applied over the fibers in a thin layer. Wax is conveyed into cross head 22 by gear pump 15. Wax is contained in drum 14 and heated by heaters 32. It is pumped from drum 14 by drump pump 31 through conduit 33 by gear pump 16, thence through conduit 17 into static mixer 18 where it is mixed with a colorant. The colorant is stored in drum 21, heated by heaters 34 and pumped from the drum by drum pump 20. It is then pumped through conduit 34 by gear pump 19 into conduit 35 and thence into static mixer 18. Obviously, the colorant is an optional feature and the apparatus associated with it is not essential.

Fibers coated with filling compound 13 are then passed through crosshead 22 in which they are encased by either the wax itself without any colorant or the wax mixed with a colorant (as the case may be), via conduit 36 producing a stand alone composite, wax encased optical fiber 1. See FIG. 1. The wax encased fibers then enter a cooling trough 24 to cool the wax to room temperature and form a solid material. The forward motion of the fibers is created by a capstan (not shown) located downstream from the cooling trough. After the capstan, the wax enclosed fiber bundles are taken up onto a reel or can enter directly into a subsequent process, along with other bundles, where such bundles are disposed in a filled (see element 31) buffer tube 6 to form a structure like that shown by element 30 in FIG. 2. Subsequently, these buffer tubes 30 can be further encased by an additional jacket 5 and a filling compound 40 in the space 8. See element 4 of FIG. 2.

A source of colorants for the wax compounds may be ICI Americas, more particularly a subdivision thereof identified as PDI. This organization produces colorants that are compatible to the A-C products manufactured by Allied-Signal, Inc., previously identified. Further identification of PDI is ""PDI: A Business Unit of ICI Americas, 54 Kellog Court, Edison, N.J., 08818".

Charasteristic or Properties of a Desirable Wax

The preferred embodiment of wax that may be used in this invention is the EAA/EVA terpolymer, A-CX-4252 previously identified, however this wax would not qualify as a wax under some chemical definitions. In the materials industry, the term "wax" seems to be rather indefinite in meaning, but appears to refer to any organic material exhibiting a certain set of characteristics. These characteristics include (1) high lubricity; (2) low molecular weight; (3) low melting point; (4) solid at room temperature; and, (5) less physical integrity than plastics. Obviously, any wax employed in this invention must have all of the characteristics set forth in (1) through (5). In addition thereto, only those with the following characteristics would be suitable for the practice of this invention: (1) modulus of elasticity not greater than 200,000 psi at room temperature and not greater than 350,000 psi at −40° C.; (2) elongation at break not less than ten percent (10%) at room temperature; and, (3) low tear strength. In order to remove the wax with a fingernail, the material must have a relatively low tear strength. The term "low tear strength" for this invention means that with a fingernail of an ordinary human hand, the wax can be removed without damage to the optical fiber.

What is claimed is:

1. A fiber optic cable comprising:
(a) a plurality of free standing composites composed of an optical fiber circumscribed by a wax, each composite circumscribed by a tube-shaped member; and, (b) a jacket, circumscribing said tube shaped members, delimiting a space in which said tube shaped members are disposed.

2. The fiber optic cable of claim 1 further including an organic flooding compound disposed in at least a part of said space not otherwise occupied by said tube shaped members.

3. The fiber optic cable of claim 1 wherein the wax of each free standing composite is colored.

4. The optical fiber cable of claim 3 further including an organic filling compound in said tube shaped member in which the wax of the free standing composites is essentially non dispersible.

5. An all dielectric fiber optic cable comprising a plurality of buffer tubes at least one of which contains one or more optical fibers and a jacket of dielectric material circumscribing said plurality of buffer tubes, wherein each buffer tube containing an optical fiber has a sidewall, said sidewall has first and second zones, said first zone comprising a dielectric material essentially free of elongated strength members delimiting a cavity in which said optical fibers are disposed and said second zone is integral with said first zone, circumscribes said first zone, and is comprised of elongated strength members embedded in a dielectric material and at least some of said optical fibers are circumscribed by a wax.

6. The fiber optic cable of claim 5 wherein the wax is colored.

7. The fiber optic cable of claim 6 further including an organic filling compound in said buffer tubes in which said wax is essentially non dispersible.

* * * * *